United States Patent [19]

Gittler

[11] 4,278,149
[45] Jul. 14, 1981

[54] TRANSLATIONALLY MOVABLE IDLER GEAR AS CLUTCH FOR SPRING DRIVEN MOTOR

[75] Inventor: Max Gittler, Northport, N.Y.

[73] Assignee: Aladdin Toy Motors, Inc., Brooklyn, N.Y.

[21] Appl. No.: 36,270

[22] Filed: May 4, 1979

[51] Int. Cl.³ .............................................. F03G 1/00
[52] U.S. Cl. ...................................... 185/39; 74/406; 368/98; 368/206
[58] Field of Search ...................... 185/37, 39, DIG. 1; 46/206; 74/406; 368/89, 98, 206, 209, 216

[56] References Cited

U.S. PATENT DOCUMENTS

| 3,180,168 | 4/1965 | Harris | 74/406 X |
| 3,621,939 | 11/1971 | Hughes | 185/DIG. 1 X |
| 3,798,832 | 3/1974 | Terzian | 46/206 |
| 3,919,804 | 11/1975 | Nakata | 46/206 |

FOREIGN PATENT DOCUMENTS

| 165966 | 7/1921 | United Kingdom | 185/DIG. 1 |
| 682252 | 11/1952 | United Kingdom | 185/37 |

Primary Examiner—Allan D. Herrmann
Attorney, Agent, or Firm—Jordan and Hamburg

[57] ABSTRACT

In a spring driven motor having a drive gear (22) driven by a spiral drive spring (20) operatively connected thereto and a gear train for receiving and changing the rate of rotary motion imparted to the drive gear (22) by the drive spring (20), an improved clutch mechanism comprises an idler gear (30) interposed between the drive gear (22) and a gear (23b) of the gear train immediately adjacent thereto and support means (31) rotatably supporting the idler gear (30) and permitting the idler gear (30) to move translationally between a position in which the idler gear (30) is in simultaneously driven engagement with the drive gear (22) and driving engagement with the adjacent gear (23b) and a position in which the idler gear (30) is out of the aforementioned simultaneous driven and driving engagement.

4 Claims, 2 Drawing Figures

TRANSLATIONALLY MOVABLE IDLER GEAR AS CLUTCH FOR SPRING DRIVEN MOTOR

BACKGROUND OF THE INVENTION AND PRIOR ART STATEMENT

This invention relates to an improvement in a spring driven timer motor, of the type, for example, described in U.S. Pat. No. 4,135,474. More specifically, this invention relates to an improved mechanism for disengaging the winding shaft of the timer from positive, driving engagement with at least that segment of the timer's drive train including the governor during winding of the timer.

A spring wound timer motor must have a governor included in its drive train in order to slow the unwinding of the timer's spring sufficiently that the timer operates to measure a desired interval of time. The inertial and frictional resistance exerted by such a governor is so great, however, as to make the required manual winding of the drive spring for actuation of the timer exceedingly difficult. Moreover, it is usually desired that during winding of the motor, no other movement in the motor occur. Consequently, it is conventional in such a timer to provide a mechanism for disengaging the winding shaft of the timer, to which the torque of the coiled drive spring is directly transmitted by connection of one end of the spring to the shaft together with connection of the other end of the spring to the timer housing, from at least that segment of the timer's drive train including the governor during winding of the timer. Such a mechanism may conveniently be called a "clutch."

One such clutch mechanism is illustrated in the aforementioned U.S. Pat. No. 4,135,474. In particular, the shaft 24c of a member 24 of the gear train is journalled at its ends in identical, substantially vertical slots in opposed walls of the timer housing. The spring 20 exerts upon the gear 22, which is fixed to the shaft which the spring 20 drives, a counterclockwise torque (as viewed in FIG. 2 of the aforementioned patent), whereby part 23, including a combined gear 23a and pinion 23b, has a clockwise torque imparted to it. The application to the part 24, which includes a combination of a gear 24a and a pinion 24b, of the clockwise torque of the part 23 not only imparts a counterclockwise torque to the part 24 but also urges the part 24 upwardly so that the shaft 24c thereof bears against the upper extremity of the aforementioned slot. In this position, the pinion 24b is in positive driven engagement with the gear 23a and the gear 24a is in positive driving engagement with a pinion 25b of a governor mechanism also including a star wheel 25a and a governor 26. Upon manual clockwise rotating of a gong bell 16 or a handle 13a in order to wind the timer, all the aforementioned torque directions are correspondingly reversed, whereupon the gear 24a moves out of driving engagement with the pinion 25b, the shaft 24c sliding toward the other end of the aforementioned slot in which it is journalled. Permitting the spring to unwind after the winding operation brings the gear 24a into driving engagement with the pinion 25b again.

The above described prior art arrangement has certain disadvantages. The shaft of the part which shifts must be journalled in slots in opposed walls of the housing so that design of the timer always requires that a continuous clear space be provided between the walls of the housing for receiving the shaft. The slots must be shifted it is desired to have the timer be actuated by winding in the opposite direction from the original design, which means that two sets of tooling for the housing walls are needed. Generally, it is not practical to take power off the shaft which shifts, further limiting the flexibility of application of the timer.

Other prior art arrangements which might be considered sufficiently pertinent to warrant comparison with the present invention but with respect to which the present invention is patentably distinct are as follows.

U.S. Pat. No. 2,601,908 discloses a motor for toys in which on releasing the winding key 20 to allow the spring to unwind, the toothed wheel 23, through the pinion 22, lifts the axle 12 for its gear wheel to engage with and rotate the pinion 24.

U.S. Pat. No. 3,202,006 discloses a rotating mechanism for a plating barrel in which there is used an idler gear between a drive gear and a driven gear on the barrel, the idler gear being mounted in such a way that it can move freely toward and away from drive transmitting relation between the drive and driven gears. The idler gear is held in mesh with the drive and driven gears by the forces which the latter two gears themselves exert on the idler gear. As wear occurs, the idler gear shifts automatically under these forces to take up the slack which would otherwise occur.

It is an object of the present invention to provide a clutch mechanism for a spring wound timer motor which avoids the disadvantages of the prior art.

Other objects and advantages of the invention will be apparent from the following description of the invention.

SUMMARY OF THE INVENTION

According to the invention, there is provided an improved clutch mechanism for a conventional spring driven motor, such as a timer. The conventional spring driven motor includes a drive gear, a spiral drive spring operatively connected to the drive gear for driving the drive gear and a gear or drive train for receiving and changing the rate of rotary motion imparted to the drive gear by the drive spring. (In the general description of the invention and the claims, the term "gear" is used generically to include pinions as well as gears, unless otherwise expressly limited.) The clutch mechanism of the invention comprises an idler gear interposed between the drive gear and a gear of the gear train immediately adjacent thereto and support means rotatably supporting the idler gear and permitting the idler gear to move translationally between a position in which the idler gear is in simultaneous driven engagement with the drive gear and driving engagement with the adjacent gear and a position in which the idler gear is out of the aforementioned simultaneous driven and driving engagement. More particularly, the idler gear and the support means are so arranged relative to the drive gear and the adjacent gear that rotation of the drive gear in the winding direction causes the drive gear to move and hold the idler gear out of driving engagement with the adjacent gear and rotation of the drive gear in the unwinding direction causes the drive gear to drivingly engage the idler gear and, simultaneously therewith, move and hold the idler gear in driving engagement with the adjacent gear.

While the term "drive gear" is used in the hereinbelow description of a specific embodiment to denote the gear fixed to the shaft directly driven by a spiral drive spring, in the general description of the invention and the claims that term, unless otherwise expressly limited, is used generically to denote any gear removed from the end of the gear train by at least one gear, not counting the idler gear. Such a drive gear, even when not directly connected to the drive spring is, through other gears of the gear train, operatively connected to and driven by the drive spring and, consequently, effective to drive a next adjacent gear down the gear train. Because the idler gear serves neither a step-up nor a step-down function on the rotary motion transmitted through the system but simply passively transmits the rotary motion, it is not considered part of the gear train though it is an essential link in the transmission of rotary motion through the train.

In the specific embodiment described hereinbelow, particular support means for the idler gear are illustrated for permitting the idler gear to move translationally within predetermined constraints. The invention is not limited to such specific means but also includes any other support means for the idler gear which permits the idler gear to function in an equivalent manner.

DETAILED DESCRIPTION OF A PREFERRED EMBODIMENT

Figure 1:
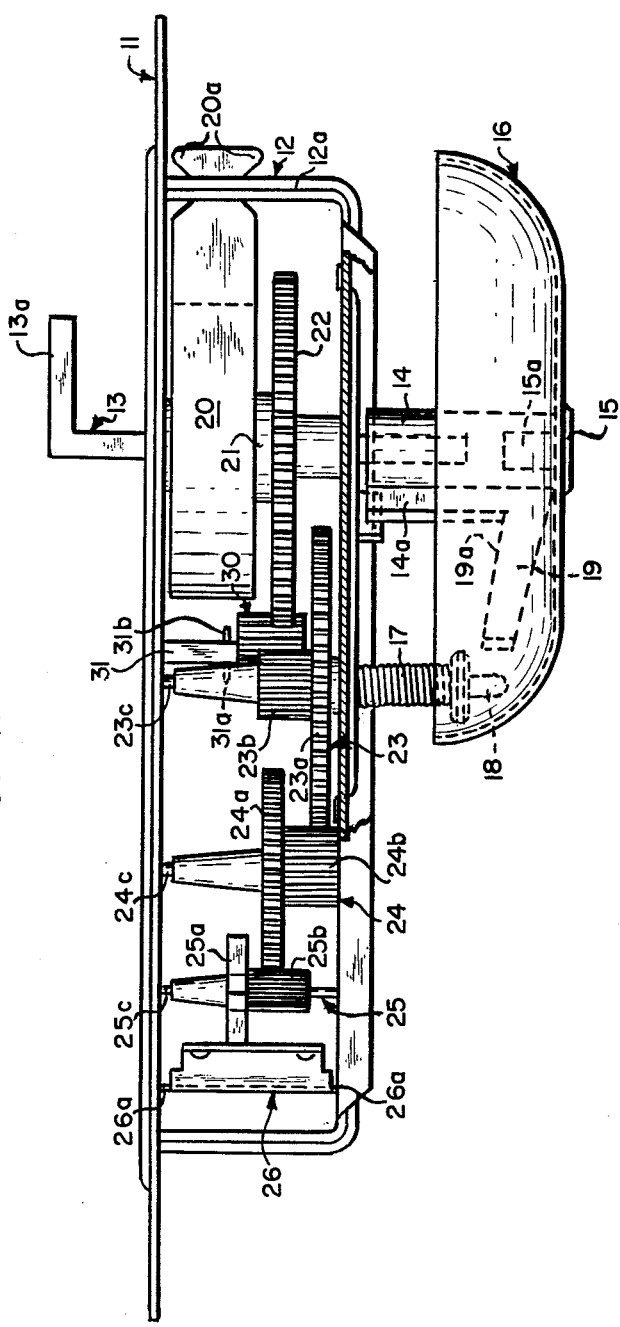
FIG. 1 is a side elevation, partly in section, of a mechanism according to the invention.

The mechanism is supported by a top housing 11 and a bottom housing 12. A winding shaft 13 passes through respective holes in the housings 11 and 12. One end of the shaft is bent at a right angle to form a handle portion 13a to facilitate manual turning of the shaft. On the other end of the shaft 13 is coaxially mounted a bell post 14 one end of which receives the square cross sectioned shaft 13 for rotation of the bell post 14 with the shaft 13. Coaxially mounted onto the other end of the bell post 14 by means of a button 15 having a shaft 15a tightly received in the bell post 14 is a gong bell 16, which rotates with the bell post 14 and the winding shaft 13. A coil spring 17 one end of which is fastened to the housing 12 carries at its other end a bell hammer 18 immediately adjacent an inner surface of the bell 16. An arm 19 is integral with and extends outwardly from the bell post 14 for rotation with the bell post 14 and the winding shaft 13.

Figure 2:
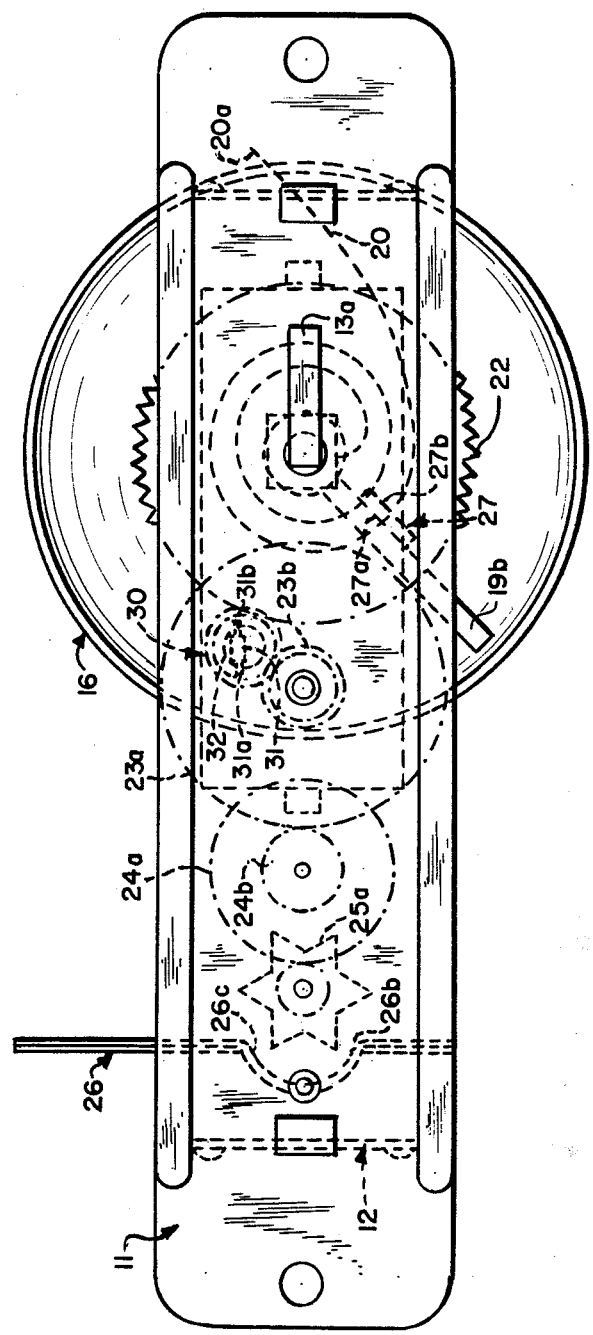
FIG. 2 is a plan view of the mechanism of FIG. 1.

Between the housings 11 and 12 is contained the works of a spring driven motor having escapement means for permitting the motor to unwind at a controlled rate. These works will now be described. A spiral spring 20 powers the motor. The inner end of the spring 20 is fixed to a block 21 mounted on the shaft 13 for rotation with the shaft 13. The outer end of the spring 20 is held in place by being received through a slot in side wall 12a of the housing 12 and being provided with ears 20a which prevent the spring end from being withdrawn through the slot. Integral with the block 21 and, therefore, rotatable with the shaft 13 and the bell post 14 is a gear 22 having sixty teeth. Rotationally mounted adjacent thereto is an integral piece 23 having a forty-eight tooth gear portion 23a, a ten-tooth pinion portion 23b and, the balance, a shaft portion 23c of varying diameter. The teeth of the gear 22 and the pinion 23b do not mesh, being separated by a relatively small space. A ten-tooth pinion 30 having a root diameter greater than the minimum distance between the circumference defined by the roots of the teeth of the gear 22 and the circumference defined by the roots of the teeth of the pinion 23b is mounted on a shaft 31 of rectangular cross-section centered below an imaginary line connecting the respective centers of the gear 22 and the pinion 23b. The shaft 31 is rigidly fixed at one end to the housing 11. The pinion 30 is journalled on the shaft 31 by means of a center circular hole 32 formed through the pinion 30. The long dimension of the rectangular cross-section of the shaft 31 is oriented substantially horizontally and is substantially smaller than the diameter of the hole 32. A pair of substantially horizontally oriented arms 31a and 31b are provided on the shaft 31, the distance from the center of the cross-section of the shaft 31 to the tip of each of the arms 31a and 31b being greater than the radius of the hole 32. Consequently, the pinion 30 is prevented by the arms 31a and 31b from sliding toward the base of the shaft 31 sufficiently to disengage from the gear 22. Regarding the opposite direction of sliding of the pinion 30 on the shaft 31, eventual abutment of the free end of the pinion 30 against the adjacent face of the gear 23a prevents the pinion 30 from falling off the shaft 31. When the motor is at rest because the spring 20 is in its "unwound" state, i.e., the spring 20 is not sufficiently tightly coiled to exert a counterclockwise torque on the gear 22 sufficient to overcome the inertia and frictional resistance of the illustated drive train, the spring 20 is, nevertheless, exerting a counterclockwise torque on the gear 22. (Here and throughout the specification, reference to rotational direction is as viewed in FIG. 2.) That torque is sufficient to cause the gear 22 to hold the pinion 30 in firm mesh, i.e., in driving engagement with the pinion 23b. Engagement of the shaft 31 with lower portions of the pinion hole 32, as illustrated in FIG. 2, simultaneously allows the pinion 30 to be in firm mesh, i.e., in driven engagement, with the gear 22. When the spring 20 is "wound," i.e., during the operation of tightening the coiling thereof so that upon release sufficient torque is exerted thereby on the gear 22 so as to drive the drive train, by rotating the gong bell 16 or the handle 13a in the clockwise direction, the aforementioned application of torque holding the pinion 30 in driving engagement with the pinion 23b is interrupted whenever the person operating the timer is rotating the gong bell 16 or the handle 13a in the clockwise direction. In fact, as such winding is performed, there is sufficient engagement of the teeth of the gear 22 with the teeth of the pinion 30 (whether a slipping engagement or, under the influence of gravity, such as if the timer is turned upside down from the orientation illustrated in FIG. 1, a driving engagement) to positively urge the pinion 30 out of driving engagement with the pinion 23b. Such driving disengagement of the pinion 30 from the pinion 23b is permitted by the very substantial oversizing of the diameter of the pinion hole 32 relative to the shaft 31, particularly the smaller dimension of the cross-section of the latter. In the state of such disengagement, the shaft 31 is out of contact with lower portions of the pinion hole 32. The dimensioning of the cross-section of the shaft 31 relative to the hole 32 and the substantially horizontal orientation of the long dimension of the cross-section of the shaft 31 are selected to provide the pinion 32 with a degree of freedom substantially greater vertically than horizontally thereby to assure reliable driving engagement of the gear 22 with the pinion 30 and of the pinion 30 with the pinion 23b when the timer is operating as well as sufficient disengagement when the spring 20 is being wound so that any engagement of the pinion 30 with the pinion 23b at such time is not greater than merely a slipping engagement.

Rotationally mounted adjacent the piece 23 is another integral piece 24, having a thirty-tooth gear portion 24a, a ten-tooth pinion portion 24b and, the balance, a shaft portion 24c of varying diameter. The gear 23a and the pinion 24b mesh. Adjacent thereto is another integral piece 25, having a six-tooth star wheel portion 25a and a six-tooth pinion portion 25b, the balance being shaft portion 25c of varying diameter. The pinion 25b and the gear 24a mesh. A governor 26 is pivotally mounted adjacent the piece 25 by means of pivot ears 26a formed on the governor 26. It will, of course, be understood that opposite ends of the shaft 23c, the shaft 24c, the shaft 25c and the respective ears 26a of the governor 26 are rotatably received in respective openings in the housings 11 and 12. The points of the star wheel 25a engage the portions 26b and 26c of the governor 26 when the star wheel 25a rotates in the direction which is clockwise as viewed in FIG. 2.

The bell post 14 includes a longitudinal rib 14a. The spring 20 imparts, as viewed in FIG. 2, a counterclockwise force to the shaft 13. A stop 27 formed on the housing 12, and against which the rib 14a abuts, maintains the spring in a partly wound condition before the motor is wound up and limits the winding and subsequent unwinding of the motor to slightly less than one complete revolution of the shaft 13. In FIG. 2, the motor is in an unwound condition, with the rib 14a abutting against the face 27a of the stop 27. In FIG. 1, the motor is in a fully wound condition with the rib 14a abutting against the opposite face 27b of the stop 27. The motor can be wound either by means of the shaft handle 13a or by means of the bell 16. The path of movement of the arm 19 intersects the hammer 18. When the motor is wound by rotating the shaft in the clockwise direction as viewed in FIG. 2 until the rib 14a abuts against the stop face 27b, the arm 19 engages the hammer 18 but is then able to pass the hammer 18 because the spring 17 on which the hammer 18 is mounted yields. The hammer strikes the bell due to this engagement but this is merely incidental, no function being served thereby. As the spring 20 unwinds, it rotates the shaft 13, and, consequently, the arm 19 in the counterclockwise direction. As the unwinding of the motor is completed, i.e., as the rib 14a completes moving toward the stop face 27a, arm 19 again engages the hammer 18, the spring 17 flexes until the flexure permits the arm to slide over the hammer 18 whereupon unflexing of the spring 17 throws the hammer 18 against the inner surface of the bell 16. The side 19a of the arm 19, which side faces away from the bell mounting end of the bell post 14 and slides over the hammer 18 as the arm 19 disengages from the hammer 18, is inclined toward the bell mounting end of the bell post 14 thereby to facilitate the disengagement of the hammer 18. More specifically, during the engagement of the hammer 18 by the arm 19, the hammer 18 moves along the leading face 19b of the arm 19 toward the bell post 14, until the combination of the shortening of the vertical spacing of the hammer 18 from the housing 12 due to the increasing flexure of the spring 17 and increasing vertical spacing from the side 19a to the housing 12 as the side 19a approaches the bell post 14 permits the side 19a to slide over the free end of the hammer 18, which disengages the arm 19 from the hammer 18. The spring 17 returns the hammer 18 to its rest position. Hence, a single sharp striking of the bell 16 has been effected.

The governor 26 and the star wheel 25a together comprise an escapement means which, through the above-described gear and pinion train, control the rate at which the motor unwinds. The entire mechanism is, therefore, suitable for use as a timer. The particular embodiment illustrated was designed as a one-minute timer. By adding weights to the governor 26, the time period for unwinding of the motor can be increased to a few minutes. By increasing the number of gears and pinions, the time interval can be yet further increased.

While the invention has been specifically described by reference to a particular embodiment, it is to be understood that the scope of the invention, as defined by the hereto appended claims, is intended to include all obvious modifications and variations.

What I claim is:

1. A clutch mechanism adapted for use in a spring driven motor including a spring, a drive gear operated by the spring,
  a power output and a gear train situated between the drive gear and the power output for changing rotational rate of the drive gear, the clutch mechanism comprising
  an idler gear interposed between two adjacent gears selected from the drive gear, the gear train and an output gear of the power output, and stationary supporting means for supporting said idler gear and permitting the idler gear to rotate and to move translationally relative to the supporting means such that the idler gear can move translationally between a position in which the idler gear is in simultaneous driven engagement with said two adjacent gears and a position in which the idler gear is out of said simultaneous driven engagement,
  wherein the idler gear has an axial opening extending therethrough and the supporting means comprises a post extending into said opening and being sufficiently smaller in cross section than said opening to permit said rotation and said translational movement.

2. A clutch mechanism according to claim 1, in which when the idler gear is located on the supporting means, the portion of the diameter of the opening not occupied by the supporting means is greater than the length of a tooth of the gear engaged therewith.

3. A clutch mechanism adapted for use in a spring driven motor including a spring, a drive gear operated by the spring, a power output and a gear train situated betwwen the drive gear and the power output for changing rotational rate of the drive gear, the clutch mechanism comprising an idler gear interposed between two adjacent gears selected from the drive gear, the gear train and an output gear of the power output, and stationary supporting means for supporting said idler gear and permitting the idler gear to rotate and to move translationally relative to the supporting means such that the idler gear can move translationally between a position in which the idler gear is in simultaneous driven engagement with said two adjacent gears and a position in which the idler gear is out of said simultaneous driven engagement,
  wherein all the gears are situated in a gear box, said supporting means being immovably fixed to said gear box to project inwardly therefrom.

4. A clutch mechanism according to claim 1 or 3, in which said idler gear is interposed between the drive gear and a first gear of the gear train for permitting easy winding of the spring for operation of the drive gear.

* * * * *